United States Patent [19]

Klein

[11] 4,110,090

[45] Aug. 29, 1978

[54] METHOD OF FORMING OPTICAL FIBERS

[75] Inventor: Richard M. Klein, Framingham, Mass.

[73] Assignee: GTE Laboratories Incorporated, Waltham, Mass.

[21] Appl. No.: 773,526

[22] Filed: Mar. 2, 1977

[51] Int. Cl.² ............................................. C03B 37/02
[52] U.S. Cl. ........................................... 65/2; 65/3 A; 65/12; 65/13; 65/30 R; 106/50; 106/54
[58] Field of Search ................ 106/50, 54; 65/2, 3 A, 65/18, 12, 30 R, DIG. 7, 13

[56] References Cited

U.S. PATENT DOCUMENTS

| | | | |
|---|---|---|---|
| 3,856,494 | 12/1974 | Kitano | 65/30 R X |
| 3,881,945 | 5/1975 | Trojer | 65/2 X |
| 3,981,707 | 9/1976 | Araujo et al. | 65/3 A |
| 4,009,014 | 2/1977 | Black et al. | 65/3 A |
| 4,040,807 | 8/1977 | Midwinter | 65/3 A |
| 4,076,512 | 2/1978 | Mellor et al. | 65/29 |

FOREIGN PATENT DOCUMENTS 2,440,770  3/1975  Fed. Rep. of Germany ............ 65/3 A 4,736,216  11/1972  Japan ........................................ 65/3 A

OTHER PUBLICATIONS

Pat. Assoc. Lit., "Optic Fibers Based on Phosphosilicate Glass", Gambling et al., Proc IEE vol. 123, No. 6, 6/1976, p. 570-575.

Pat. Assoc. Lit., "Doped-Deposited-Silica Fibers for Communications", Maurer Proc. IEE vol. 123, No. 6, 6/1976, p. 581-585.

*Primary Examiner*—Robert L. Lindsay, Jr,
*Attorney, Agent, or Firm*—David M. Keay

[57] ABSTRACT

A process is described for forming glass optical fibers by heating a glass composition to vaporize a component of the composition at the surface to reduce the refractive index of the glass surface. Four alternative processes can be used: heat treating a fiber preform followed by drawing the fiber, simultaneous heat treating and fiber pulling from a glass melt, fiber pulling followed by heat treating or heat treating the surface of a melt followed by drawing a fiber or preform so that the surface of the melt comprises the cladding.

3 Claims, No Drawings

METHOD OF FORMING OPTICAL FIBERS

BACKGROUND OF THE INVENTION

This invention relates to a process for forming optical fibers and more particularly to a vaporization process for forming optical fibers.

Optical fibers are currently undergoing intensive development as the transmission link in optical communication systems. In order to perform this function, the fiber should exhibit extremely low optical attenuation and low optical dispersion. The cores of the fibers should be relatively large to facilitate coupling with light sources and splicing between fibers; hence most practical optical fibers are multimode. To reduce modal dispersion in multimode fibers, fibers can be manufactured with refractive indices which decrease gradually from the core to the surface; in this case the higher order modes which travel longer path lengths have higher velocities, thereby allowing all modes to travel with approximately equal axial velocities.

At present, there are two general methods used to prepare graded-index optical fibers; the vapor deposition technique and the double crucible technique. In the vapor deposition method a vapor phase reaction is used to deposit the constituents onto a mandrel. During deposition, the concentrations of the constituents are varied so as to produce the composition gradient required for the desired index profile. After deposition, the preform is thermally sintered and collapsed, and then drawn into a fiber.

One disadvantage of the vapor phase technique is that it is complex and requires sophisticated control during each phase of the process. For example, since the index gradient is introduced in the initial stage of the process, all subsequent steps (i.e., sintering, collapsing and drawing) must be controlled so that no unanticipated changes occur in the gradient.

A further disadvantage of this process is that since the components are co-deposited, they must all be compatible with a single set of deposition conditions; this has largely limited the vapor deposition technique to two-component systems. Consequently, the choice of core and cladding materials is constrained because of secondary property changes which unavoidably occur when primary properties are altered. For example, it is beneficial to increase the refractive index difference between core and cladding to achieve a high numerical aperture; however, the use of two-component glasses restricts the compositional difference between core and cladding because of concomitant changes in expansion coefficient which can give unacceptably high mechanical stresses. Similarly, large compositional differences between the core and cladding may produce viscosity differences which could lead to difficulties during fiber drawing.

The second general method used to prepare optical fibers with graded refractive indices is the double crucible technique. This method consists of first preparing bulk glasses having compositions suitable for use as the core/cladding end-members; these glasses are then remelted and fibers are pulled from concentric double platinum crucibles. The combined glass stream is commonly maintained at a high temperature to permit interdiffusion between the core and cladding in order to provide a graded refractive index profile.

One disadvantage of the double crucible technique is that the index gradient is formed during fiber pulling, which means that simultaneous control is required for both the fiber drawing process and the interdiffusion process. Another disadvantage is that the double crucible technique is prone to impurity problems in the core/cladding interfacial region; specifically a relatively high ingestion of platinum can occur in this area due to partial dissolution and ablation of the drawing crucible.

It would be desirable to provide a method for forming optical fibers which avoids the disadvantages of the prior art, particularly narrow constraints on fiber components, requirements for strict process control and problems associated with impurities or inclusions at the core/cladding interface.

SUMMARY OF THE INVENTION

In accordance with this invention, a glass composition including one or more relatively volatile components is heated to vaporize the volatile component(s) and thereby to reduce the refractive index at the surface of the composition. The heating can be conducted on a fiber preform followed by drawing the fiber, simultaneous heat treating and fiber pulling from a glass melt, fiber pulling followed by heat treating or by heat treating the surface of a melt and then drawing a fiber or preform so that the surface of the melt comprises the cladding of the fiber or preform. The process of this invention is particularly useful when processing aluminum borophosphate glasses containing a volatile $P_2O_5$ component.

DETAILED DESCRIPTION OF SPECIFIC EMBODIMENTS

Suitable glass compositions useful in the present invention are those having a relatively volatile component which upon being volatilized, causes a reduction of the refractive index relative to the unvolatilized glass. Representative suitable glass compositions include the known lead glasses from which PbO is volatilized or soda-lime glasses from which $Na_2O$ is volatilized or the like. Particularly suitable glass compositions useful in the present invention are high phosphate glasses disclosed in co-pending application Ser. No. 773,527, entitled "Optical Fibers Formed of Aluminum Borophosphate Glass Compositions" filed concurrently herewith.

The high phosphate glass compositions are bounded by lines connecting the compositions 28 m% $Al_2O_3$ — 72 m% $P_2O_5$ — 0 m% $B_2O_3$; 5 m% $Al_2O_3$ — 45 m% $P_2O_5$ — 50 m% $B_2O_3$; 10 m% $Al_2O_3$ — 30 m% $P_2O_5$ — 60 m% $B_2O_3$ and 42 m% $Al_2O_3$ — 58 m% $P_2O_5$ — 0 m% $B_2O_3$. In addition, the high phosphate aluminum borophosphate glasses can contain one or more oxide modifiers such as $SiO_2$, MgO, CaO, $TiO_2$, $ZrO_2$, $Na_2O$, CdO, $SnO_2$, $Tb_2O_3$, $Eu_2O_3$, $CeO_2$ and the like. Most high phosphate glasses also are stable against degradation by water. Refractive index ranges between 1.47 and 1.58 with optical dispersion, given as $\nu$-value, between 48 and 74. The ultraviolet cutoff occurs at below about 200 nm and most glasses exhibit good solarization resistance. In addition, portions of the glass-forming regions in the high phosphate aluminum borophosphate system offer great flexibility for independently adjusting the important material properties. For example, the contour corresponding to constant values of the thermal expansion coefficient and refractive index are not parallel in large parts of the high phosphate glass-forming region. Hence, fibers produced from glasses in this zone of compositions can have a gradient in refractive index across their diameters while retaining the favorable mechanical properties inherent in a constant thermal expansion coefficient.

The high phosphate aluminum borophosphate glasses utilized herein are formed in a manner so that vaporization of the glass-forming constituents, particularly $P_2O_5$ is controlled. Materials which are sources of $Al_2O_3$, $B_2O_3$ and $P_2O_5$ are blended, calcined, if desired, and preferably melted in a crucible which does not dissolve in the glass composition or a precursor of the glass composition. Normal melting temperatures range between about 1450° C. and 1800° C., more usually between about 1500° C. and 1650° C., depending upon the specific glass composition formed. Normal seed-free firing time is between about 0.25 and 4.0 hours, preferably between about 1.0 and 2.0 hours. It is preferable to maintain minimum firing times in order to reduce vaporization of the glass-forming constituents. Representative suitable crucible materials include platinum, platinum/rhodium alloys and aluminum oxide. Since $P_2O_5$ is the most volatile glass-forming constituent, it can be added in concentrations in excess of the desired final concentration in the glass composition. Alternatively and preferably, the $P_2O_5$ is added to the crucible in the form of a refractory compound such as $AlPO_4$, $BPO_4$, $AlP_3O_9$ or refractory modifying cation phosphates such as $Mg_2P_2O_7$, $Ca_3(PO_4)_2$, $ZrP_2O_7$ or the like. By adding $P_2O_5$ as a refractory compound, improved control of the final glass composition is attained. After substantially complete reaction of the reactants is obtained in the melt, it is cooled in any conventional manner such as by air cooling or by cooling between steel plates to obtain the final amorphous glass composition. Representative sources of $Al_2O_3$ are $Al_2O_3$, $AlPO_4$, $AlP_3O_9$ and modifying cation borates such as $Mg_3B_2O_6$.

The glasses described above are utilized to form optical fibers having a composition on and near its surface with a refractive index lower than the refractive index of the glass composition forming the interior of the fiber. The difference between the refractive index of the cladding and the core is at least about 0.007, preferably at least about 0.015. Generally, the optical fibers have a core diameter between about 45 and 65 μm and a cladding outer diameter between about 100 and 160 μm.

In the process of this invention, the glass is heated to selectively vaporize a component of the composition from the surface of the glass. In each process, the glass composition is heated to selectively vaporize the volatile component such as $P_2O_5$, PbO or $Na_2O$ from the surface, i.e. that region that ultimately forms the cladding of the optical fiber. This process must act to reduce the refractive index of the glass composition. Heating is conducted at a temperature and time dependent on glass composition and method used. In general, the temperature should be high enough (usually above the glass transition temperature) so that the vaporization process is not unduly long. However, the temperature and time of heat treatment must be chosen such that crystallization and phase separation, which may occur for specific compositions, are avoided. Moreover, for those embodiments which involve heating preforms or fibers, the time and temperature used should not cause undesirable deformation due to viscous flow. The vaporization step may be conducted in a vacuum in order to increase the rate of selective vaporization. In one embodiment, the optical fiber is made by first forming a preform of the optical fiber, then heat treating the preform to establish the refractive index gradient and drawing the preform to make the fiber. The preform can be made by casting or pulling or other appropriate techniques. After the preform is heat treated, the fiber is drawn at high temperatures under conditions to assure that the portion of the preform deficient of the volatile component forms the cladding of the optical fiber and the portion of the preform which retains the volatile component after heat treatment, forms the core of the optical fiber.

In another aspect of the process for forming the optical fibers, the components of the glass composition are melted to form the glass. The fiber then is drawn from the melt and while being drawn, is heat treated to effect selective vaporization of the volatile component under the conditions set forth above. This technique also can be utilized by first forming a preform, drawing the optical fibers from the preform and heat treating the fiber while it is being drawn. An alternative process comprises forming a fiber by drawing it from the glass melt or preform. Thereafter, the fiber is heat treated to vaporize the volatile component from its surface under the conditions set forth above. Alternatively, the surface of a melt is heat treated to evaporate the volatile constituent and a fiber or preform is drawn from the melt in a manner such that the surface of the melt comprises the cladding and the body of the melt comprises the core.

The optical fibers produced by the process of this invention are characterized by a graded refractive index which increases from the cladding to the core and reflects the degree of vaporization of the volatile component. The difference between the refractive index of the cladding and the core should be at least about 0.007, preferably greater than 0.015. The ultraviolet cutoff is at least 200 nm so that the fiber has a low absorption coefficient (i.e. non-purity related).

The following examples illustrate the present invention and are not intended to limit the same.

EXAMPLE I

A glass was prepared by melting aluminum metaphosphate ($AlP_3O_9$) at 1475° C. for about 45 min. in a platinum crucible. Then the crucible containing the molten glass was removed from the furnace, and a fused silica rod was dipped into and withdrawn from the melt, causing a fiber of aluminum metaphosphate glass to be pulled from the melt. This process of dipping and withdrawing was repeated several times as the aluminum metaphosphate glass cooled.

One fiber produced in the above manner had a diameter of 1.2 mm; this sample, without further treatment, was cross-sectioned, polished, and examined in the electron microprobe to determine the elemental composition as a function of radial position. Results showed that the surface glass composition contained 10% less phosphorous than that of the interior; this compositional difference corresponds to a surface refractive index which was 0.02 lower than that of the interior. The thickness of the altered surface layer was about 50 μm. This example demonstrates the embodiment which involves simultaneous fiber pulling and heat treatment and/or the embodiment which involves heat treating the molten glass followed by fiber pulling from the top surface.

EXAMPLE II

This example demonstrates the embodiment which involves pulling of fibers and subsequent heat treatment of the fibers.

A glass having a batch composition of 60 m% AlP$_3$O$_9$ and 40 m% SiO$_2$ was prepared by mixing 76.8g AlP$_3$O$_9$ and 23.3g SiO$_2$. The batch was calcined at 700° C. for 2 h, remixed, and fired at 1500° C. for 0.5 h in a platinum crucible. After firing, the crucible was removed from the furnace, and fibers were pulled from the glass during cooling using the procedure described in Example I.

Several fibers were subsequently heat treated in a vacuum for 24 h at 812° C. These fibers were examined with the electron microprobe. A composition difference was found between the surface and interior regions of the fiber, with the surface being depleted in phosphorus by about 25% and enriched in aluminum by a similar amount. The silicon concentration remained nearly constant across the diameter of the fiber. The thickness of the altered surface layer was 5–20 μm, and the composition difference between surface and interior likely corresponds to a refractive index difference of greater than about 0.02.

EXAMPLE III

This data is found in I. Fanderlik and M. Skrivan, *Silikaty,* Vol. 17, page 295, 1973.

A glass having the composition 64 weight percent SiO$_2$, 21% PbO and 15% K$_2$O, which has a bulk refractive index of 1.526, was heated in a platinum crucible at 1400° C. for 100 hours. After this time, the crucible was carefully removed from the furnace and cooled so as not to disturb the volatilization-induced surface layer. Refractive index measurements made after annealing show that there is an index gradient on and near the surface, induced by the heat treatment. The gradient, which results from the volatilization of PbO from the surface, goes from lower values on the surface to the bulk value over a depth of about 5 mm and consists of an index change of about 0.4.

These results imply that after heat treatment, a melt of the above composition could be used to form a preform for optical fibers by pulling a rod from the upper surface, e.g., using a method similar to that described by K. J. Beales et al, *Post Office Electrical Engineering Journal,* Vol. 67, page 80, 1974. These results therefore demonstrate the embodiment which involves heat treating a melt followed by pulling a preform from the top surface.

I claim:

1. The process for forming an optical fiber which comprises heating a melt of a glass composition to selectively volatilize at least one component of said composition from the surface region of said melt to reduce the refractive index at said surface, and drawing the heated glass composition into an optical fiber comprising a cladding formed of material from said selectively volatilized surface region and a core comprising said glass composition wherein said heating is carried out at a temperature of between about 1400° C. and about 1800° C. for a period of time sufficient to reduce the refractive index of said surface region by an amount of at least 0.02.

2. The process of claim 1 wherein said glass composition is a high phosphate glass bounded by lines connecting the compositions: 28 mole percent Al$_2$O$_3$ — 72 mole percent P$_2$O$_5$ — 0 mole percent B$_2$O$_3$, 5 mole percent Al$_2$O$_3$ — 45 mole percent P$_2$O$_5$ — 50 mole percent B$_2$O$_3$; 10 mole percent Al$_2$O$_3$ — 30 mole percent P$_2$O$_5$ — 60 mole percent B$_2$O$_3$ and 42 mole percent Al$_2$O$_3$ — 58 mole percent P$_2$O$_5$ and 0 mole percent B$_2$O$_3$.

3. The process of claim 1 wherein the glass composition comprises a lead silicate glass.

* * * * *